(12) United States Patent
Yanagi

(10) Patent No.: US 6,829,255 B1
(45) Date of Patent: Dec. 7, 2004

(54) CDMA BASE STATION TRANSMISSION DEVICE AND METHOD

(75) Inventor: Shuzo Yanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 894 days.

(21) Appl. No.: 09/627,747

(22) Filed: Jul. 28, 2000

(30) Foreign Application Priority Data

Jul. 29, 1999 (JP) .......................................... 11-214463

(51) Int. Cl.[7] .................................................. H04J 3/02
(52) U.S. Cl. ...................... 370/541; 370/539; 370/335; 370/320
(58) Field of Search ............................... 370/320, 335, 370/342, 465, 539, 541

(56) References Cited

U.S. PATENT DOCUMENTS 5,533,012 A * 7/1996 Fukasawa et al. .......... 370/342
6,347,220 B1 * 2/2002 Tanaka et al. ........... 455/277.2
6,639,937 B2 * 10/2003 Doetsch et al. ............. 375/130

* cited by examiner

Primary Examiner—Alpus H. Hsu
Assistant Examiner—Thien Tran
(74) Attorney, Agent, or Firm—Dickstein, Shapiro, Morin & Oshinsky, LLP.

(57) ABSTRACT

Disclosed is a CDMA base station transmission device having: a first spread multiplex synthesis unit that spreads and multiplexes transmit data of a predetermined number of users to be selected from a plurality of users; and a second spread multiplex synthesis unit that is additionally provided when the number of users increases. The first spread multiplex synthesis unit is provided with a first multiplex synthesis part inside the unit, and the first multiplex synthesis part adds the spread-multiplexed data of the first spread multiplex synthesis unit and the spread-multiplexed data of the second spread multiplex synthesis unit, D/A-converts the added spread-multiplexed data, modulates it into radio frequency band, transmits it through the antenna.

8 Claims, 5 Drawing Sheets

CDMA BASE STATION TRANSMISSION DEVICE AND METHOD

FIELD OF THE INVENTION

This invention relates to a CDMA (code division multiple access) base station transmission device and a method for conducting the spread multiplex transmission in a CDMA base station transmission device.

BACKGROUND OF THE INVENTION

In conventional CDMA base station transmission devices, transmit data is spread by spread code to each user for each symbol, as unit data of each user, then multiplex-synthesized by the number of users. D/A converted for each antenna used to transmit it, modulated into radio frequency band, then transmitted. Here, the unit to be spread-multiplexed is each antenna. Therefore, it is necessary to provide a spread multiplex circuit for each antenna. When the spread multiplex circuit is provided for each antenna, the circuit needs to be composed so that transmit data corresponding to all supposed users as the input end of the spread multiplex circuit can be input.

FIG. 1 shows a case of conducting the spread multiplex transmission for data of L users selected from transmit data of N users. In this case, transmit data 110 (1) to 110 (N) of the N users are input to a user selection part 111 in a spread multiplex synthesis unit 101, where transmit data corresponding to the number of users to be transmitted by a transmitting antenna 105 are selected. In FIG. 1, data of L users (N≧L) are selected. The user transmit data selected are input to spread modulation parts 112 (1) to 112 (L), where the spreading is conducted. The spreading is done by a spreading part 116 using spread codes generated from a spread code generation part 115. Signals of L users after the spreading are synthesized by a multiplex synthesis part 113, then D/A converted by a D/A converter 103. The D/A converted spread multiplex signal of L users is modulated into radio frequency band by an orthogonal modulation part 104, then transmitted through the transmission antenna 105.

FIGS. 2 and 3 each show circuit compositions in a case that the number of users to be transmitted in FIG. 1 increases by that of M users (M≧L) from N users. In FIG. 2, when the number of users transmitted increases by M, the user selection part 111 in the spread multiplex synthesis unit 101 is altered, thereby data of L users are selected from those of (N+M) users, and are input to the spread modulation parts 112 (1) to 112 (L). In this case, the maximum multiplex number to be transmitted through the transmission antenna 105 is L, the same as the case in FIG. 1. It is impossible to select the number of users more than L from the (N+M) users and to spread-multiplex them.

In contrast with this, in FIG. 3, when the number of users transmitted increases by M, a spread multiplex synthesis unit 102 for spread-multiplexing selecting by L users from the M users is added, other than the spread multiplex synthesis unit 101 for spread-multiplexing selecting by L users from the N users in FIG. 1. The outputs of these two spread multiplex synthesis units are multiplexed by an additional multiplex synthesis part 114. Thus, in this case, the spread synthesis multiplexing of (2×L) users at the maximum can be conducted, but the additional multiplex synthesis part 114 is required. Also, this multiplex synthesis part needs to be provided with a composition independent of the spread multiplex synthesis unit for each unit of antenna, therefore causing an increase in circuit part for each unit of antenna.

SUMMARY OF THE INVENTION

Accordingly, it is an object of the invention to provide a CDMA base station transmission device that, even when the number of users increases, an increase in the scale of circuit part dependent on each unit of antenna can be suppressed and the device adaptable can be composed easily by the addition of spread multiplex synthesis unit.

According to the invention, a CDMA base station transmission device for spreading transmit data by spread code to each user for each symbol as unit data of each user, multiplex-synthesizing the spread data by the number of users, D/A-converting the multiplexed data, modulating the D/A-converted data into radio frequency band, then transmitting the modulated data through an antenna, comprises:
    a first spread multiplex synthesis unit that spreads and multiplexes transmit data of a predetermined number of users to be selected from a plurality of users; and
    a second spread multiplex synthesis unit that is additionally provided when the number of users increases and that spreads and multiplexes transmit data of a predetermined number of users to be selected from a plurality of users;
    wherein the first spread multiplex synthesis unit is provided with a first multiplex synthesis part inside the unit, and the first multiplex synthesis part adds the spread-multiplexed data of the first spread multiplex synthesis unit and the spread-multiplexed data of the second spread multiplex synthesis unit, D/A-converts the added spread-multiplexed data, modulates it into radio frequency band, transmits it through the antenna.

According to another aspect of the invention, a method for conducting the spread multiplex transmission in a CDMA base station transmission device, comprises the steps of:
    in a first multiplex synthesis part for spreading transmit data by spread code to each user for each symbol as unit data of each user, multiplex-synthesizing the spread data by the number of users, adding the spread-multiplexed data of the first spread multiplex synthesis unit and the spread-multiplexed data of a second spread multiplex synthesis unit that is additionally provided;
    D/A-converting the added spread-multiplexed data;
    modulating the D/A-converted data into radio frequency band; and
    transmitting the modulated data through an antenna.

According to another aspect of the invention, a method for conducting the spread multiplex transmission in a CDMA base station transmission device, comprises the steps of:
    in a first spread multiplex synthesis unit for spreading transmit data by spread code to each user for each symbol as unit data of each user, multiplex-synthesizing the spread data by the number of users, adding the spread-multiplexed data of the first spread multiplex synthesis unit and the spread-multiplexed data of a second spread multiplex synthesis unit that is additionally provided;
    in the second spread multiplex synthesis unit, adding the spread multiplexed data of the first spread multiplex synthesis unit and the spread-multiplexed data of the second spread multiplex synthesis unit;
    D/A-converting the added spread-multiplexed data for each antenna;
    modulating the D/A-converted data into radio frequency band; and
    transmitting the modulated data through the antenna.

In this invention, the spread multiplex synthesis unit is, inside the unit, provided with a function for adding the multiplexed data from another spread multiplex synthesis unit to its multiplexed data and a function for controlling the addition of the multiplexed data. So, even when the number of users to be transmitted increases, with the additionally-provided spread multiplex synthesis unit, the spread-multiplexing of data of the increased users can be conducted and the spread-multiplexed data can be added to the spread-multiplexed data of the other spread multiplex synthesis unit. Therefore, an increase in the scale of circuit part dependent on each unit of antenna can be suppressed and the device adaptable can be composed easily by the addition of spread multiplex synthesis unit.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
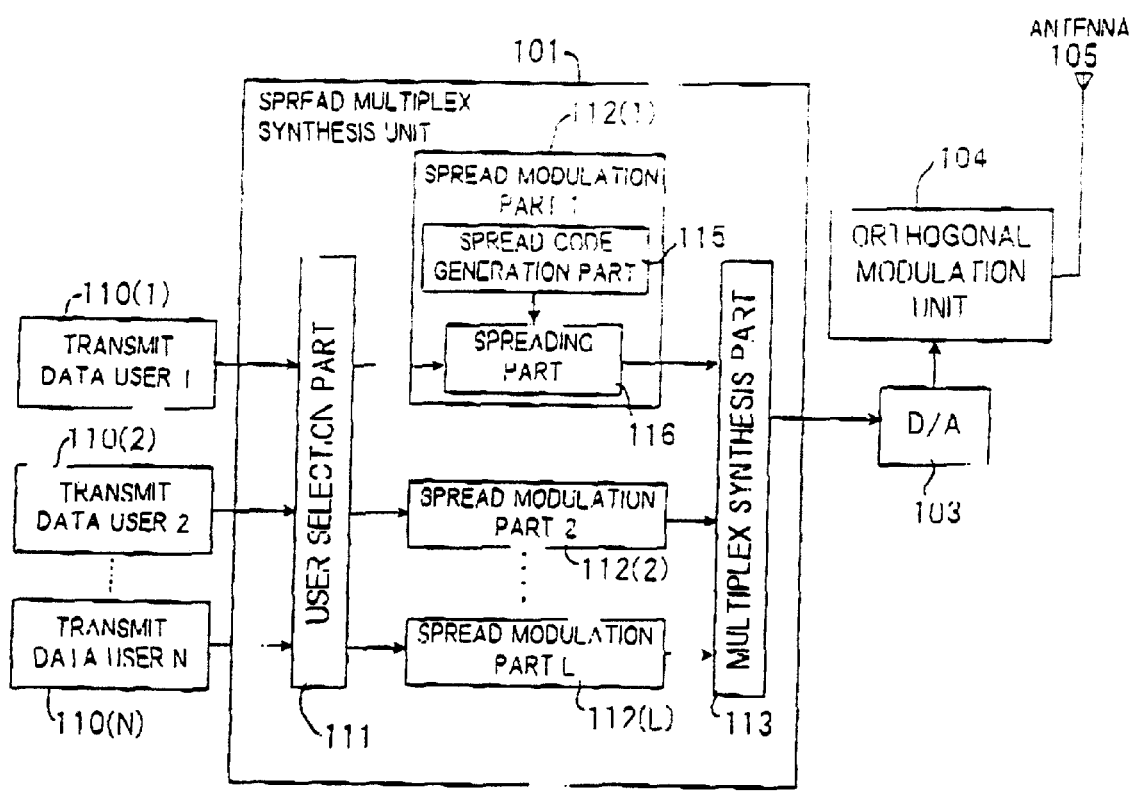
FIG. 1 is a block diagram showing the composition of the conventional CDMA base station transmission device for conducting the spread multiplex transmission for data of L users selected from transmit data of N users.

The preferred embodiments of this invention will be explained below referring to the drawings.

Figure 4:
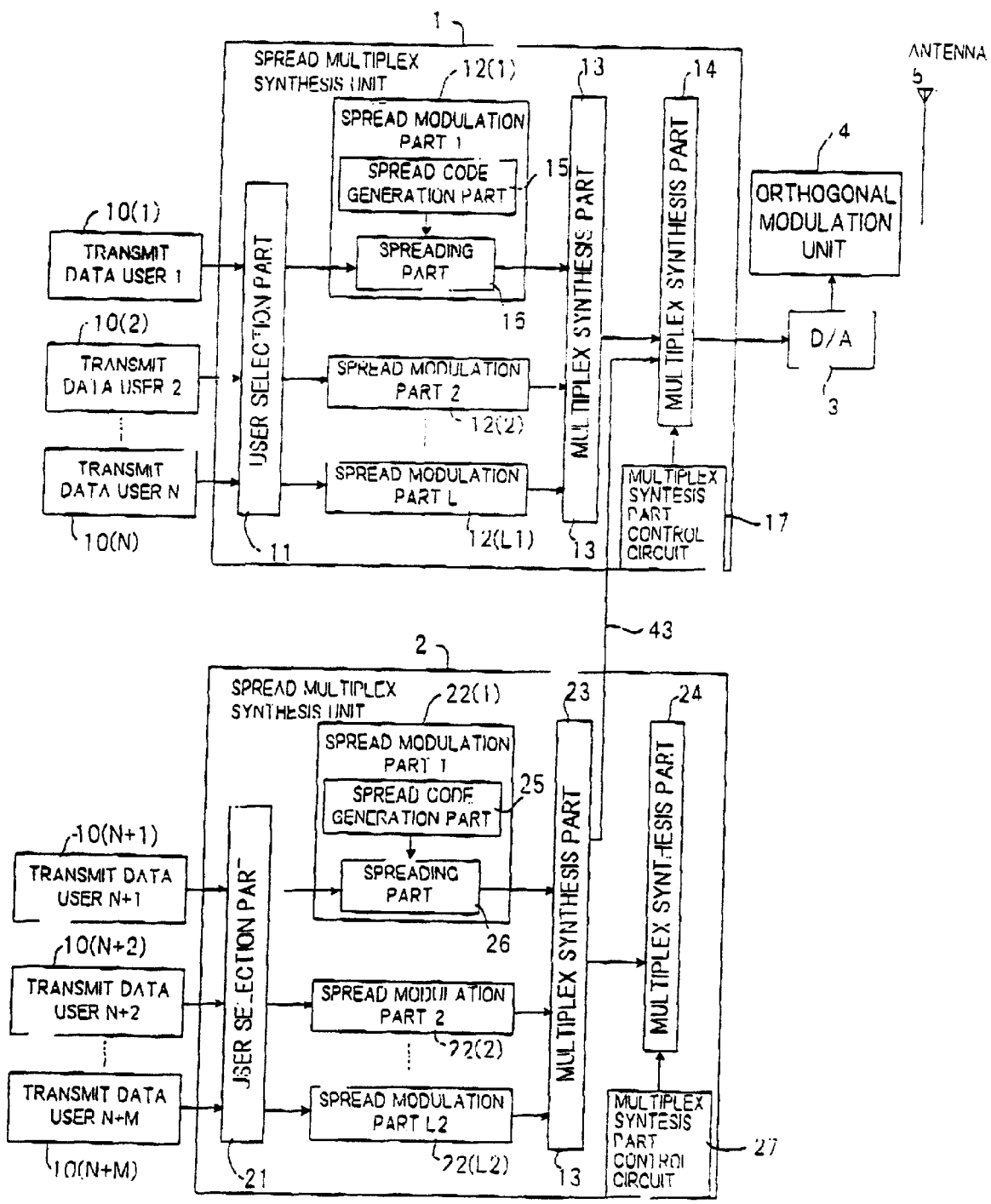
FIG. 4 is a block diagram showing the composition of a CDMA base station transmission device in a first preferred embodiment according to the invention.

FIG. 4 is a block diagram showing a CDMA base station transmission device in the first preferred embodiment according to the invention. In FIG. 4, the CMDA base station transmission device is composed of spread multiplex synthesis unit 1 for spread-multiplexing transmit data 10 (1) to 10 (N), a spread multiplex synthesis unit 2 for spread-multiplexing transmit data 10 (N+1) to 10 (N+M), a D/A converter 3, an orthogonal modulation unit 4, and an antenna 5.

The spread multiplex synthesis unit 1 is composed of a user selection part 11, spread modulation parts 12 (1) to 12 (L1) inside each of which a spread code generation part 15 and a spreading part 16 are provided, multiplex synthesis parts 13, 14, and a multiplex synthesis part control circuit 17. The spread multiplex synthesis unit 2 is composed of a user selection part 21, spread modulation parts 22 (1) to 22 (L2) inside each of which a spread code generation part 25 and a spreading part 26 are provided, multiplex synthesis parts 23, 24, and a multiplex synthesis part control circuit 27.

Figure 2:
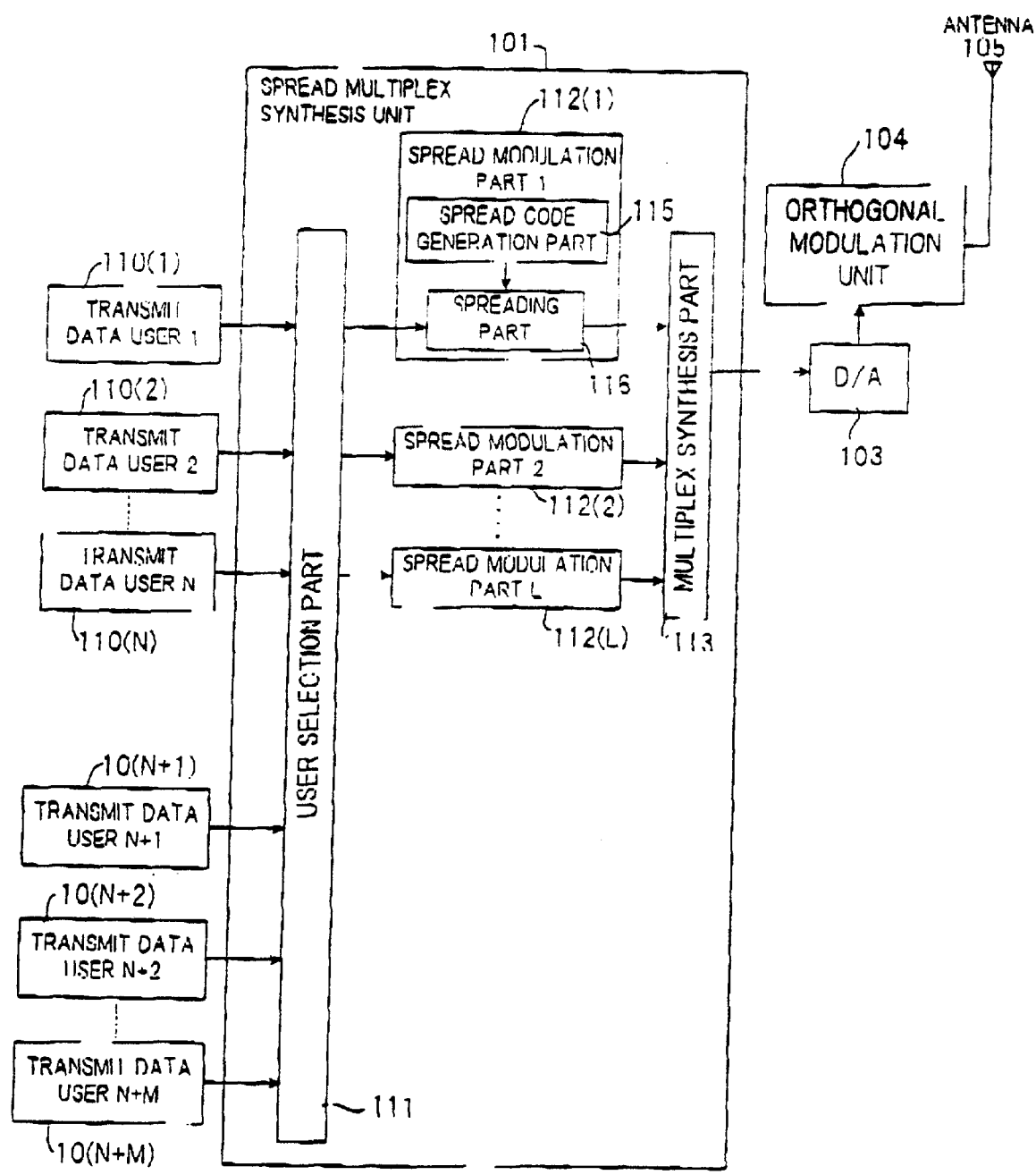
FIG. 2 is a block diagram showing the composition of the conventional CDMA base station transmission device for a case that the number of users to be transmitted in FIG. 1 increases by that of M users from N users.
Figure 3:
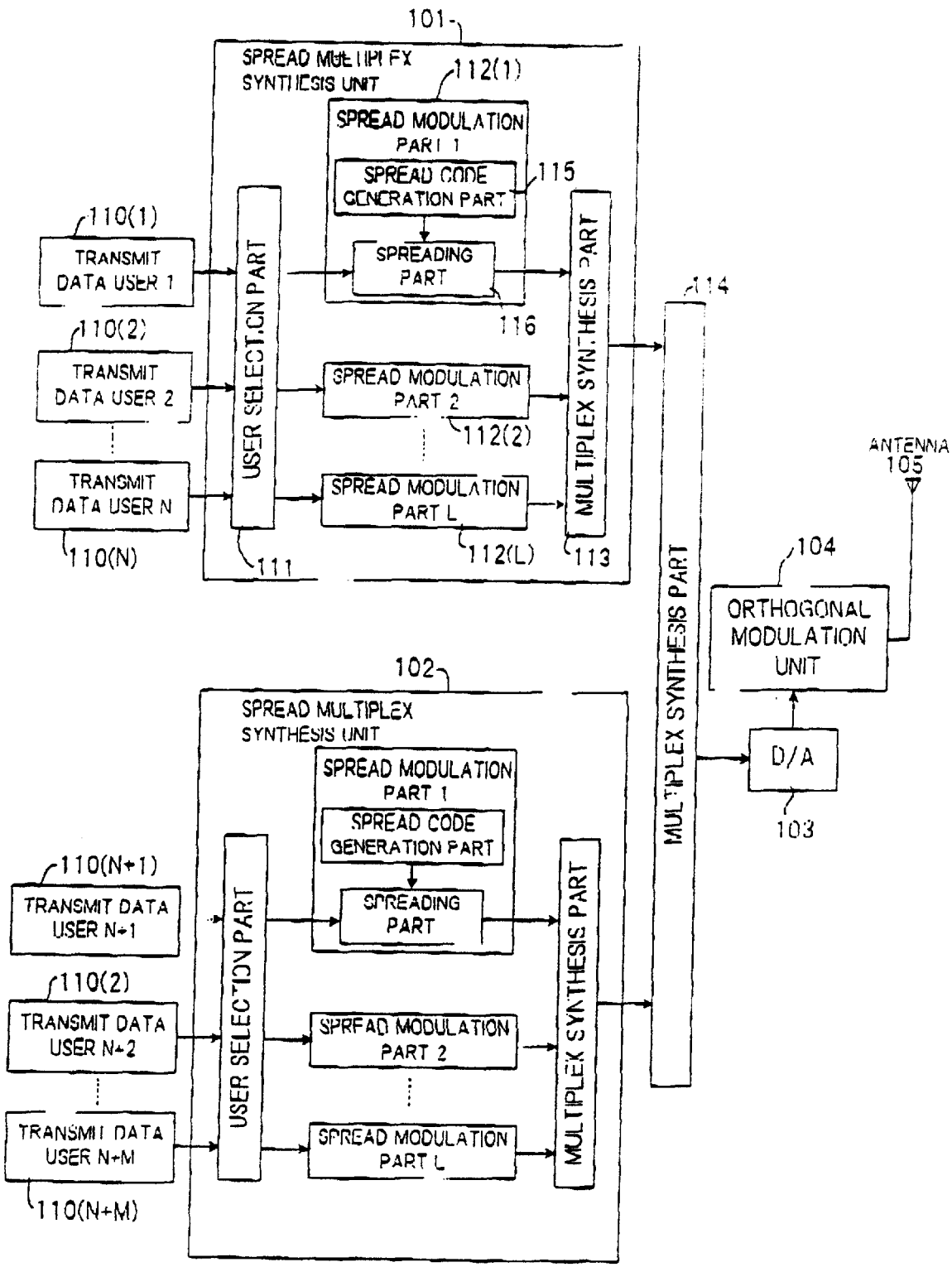
FIG. 3 is a block diagram showing the composition of the conventional CDMA base station transmission device for a case that the number of users to be transmitted in FIG. 1 increases by that of M users from N users.

In FIG. 4, the different point from the prior compositions in FIGS. 2 and 3 is that, in the spread multiplex synthesis unit 1, the additional multiplex synthesis parts 14, 24 are provided and the multiplex synthesis part control circuits 17, 27 for conducting the output control of the multiplex synthesis parts 14, 24 are provided. Also, the other different point from the prior compositions is that the multiplex synthesis part 23 is provided with two output routes, one of which (43) is input to the multiplex synthesis part 14 of the spread multiplex synthesis unit 1.

In FIG. 4, the multiplex synthesis part 14 in the spread multiplex synthesis unit 1 conducts the synthesis of the spread multiplex data of L1 users selected from transmit data of N users connected to the spread multiplex synthesis unit 1 and the spread multiplex data of L2 users selected from transmit data of M users connected to the spread multiplex synthesis unit 2, then outputting the spread-multiplexed data of (L1+L2) users to the D/A converter 3.

Also, the multiplex synthesis part control circuits 17, 27 controls whether to actuate a multiplexing circuit in the multiplex synthesis parts 14, 24 and whether to output multiplexed data. In this case, the multiplex synthesis part control circuit 17 controls the multiplexing circuit in the multiplex synthesis part 14 to be actuated so as to output the multiplexed data, and the multiplex synthesis part control circuit 27 controls the multiplexing circuit in the multiplex synthesis part 24 to stop so as not to output the multiplexed data.

The operation in this embodiment will be explained below.

In FIG. 4, explained is a case that for the base station transmission device to conduct the spread multiplex transmission of data of L1 (=3) users selected from transmit data of N(=10) users, the number of users to be selected increases by M(=5) users and it becomes necessary to conduct the spread multiplex transmission of data of L2 (=4) users selected from transmit data of M(=5) users. In this case, transmit data 10 (1) to 10 (10) of 10 users are input to the user selection part 11 in the spread multiplex synthesis unit 1, and transmit data of 3 users to be transmitted through the transmission antenna 5 are selected therein.

The selected transmit data of 3 users are input to the spread modulation parts 12 (1) to 12 (3), respectively, and are subject to the spreading. The spreading is conducted by the spreading part 16 using spread codes for each user generated from the spread code generation part 15. Signals of 3 users after the spreading are synthesized by the multiplex synthesis part 13.

In like manner, transmit data 10 (11) to 10 (15) of the increased 5 users are input to the user selection part 21 in the spread multiplex synthesis unit 2, and transmit data of 4 users to be transmitted through the transmission antenna 5 are selected therein.

The selected transmit data of 4 users are input to the spread modulation parts 22 (1) to 12 (4), respectively, and are subject to the spreading. The spreading is conducted by the spreading part 26 using spread codes for each user generated from the spread code generation part 25. Signals of 4 users after the spreading are synthesized by the multiplex synthesis part 23.

The multiplexed data of 4 users is input through the route 43 to the multiplex synthesis part 14 in the spread multiplex synthesis unit 1. The multiplex synthesis part 14 in the spread multiplex synthesis unit 1 adds the multiplexed data of 3 users from the multiplex synthesis part 13 and the multiplexed data of 4 users input through the route 43, then outputting the multiplexed data of 7 users in total.

In the process, the multiplex synthesis part control circuit 17 in the spread multiplex synthesis unit 1 controls the adder (multiplexing) circuit of the multiplex synthesis part 14 to be actuated, and controls the multiplex synthesis part 14 to be allowed to output data. Also, the multiplex synthesis part control circuit 27 in the spread multiplex synthesis unit 2 controls the adder (multiplexing) circuit of the multiplex synthesis part 24 to stop, and controls the multiplex synthesis part 24 not to be allowed to output data.

The multiplexed data of 7 users is D/A-converted by the D/A converter 3. The D/A converted spread-multiplexed signal of 7 users is modulated into radio frequency band by the orthogonal modulation unit 4, then transmitted through the transmission antenna 5.

The second preferred embodiment of the invention will be explained below.

Figure 5:
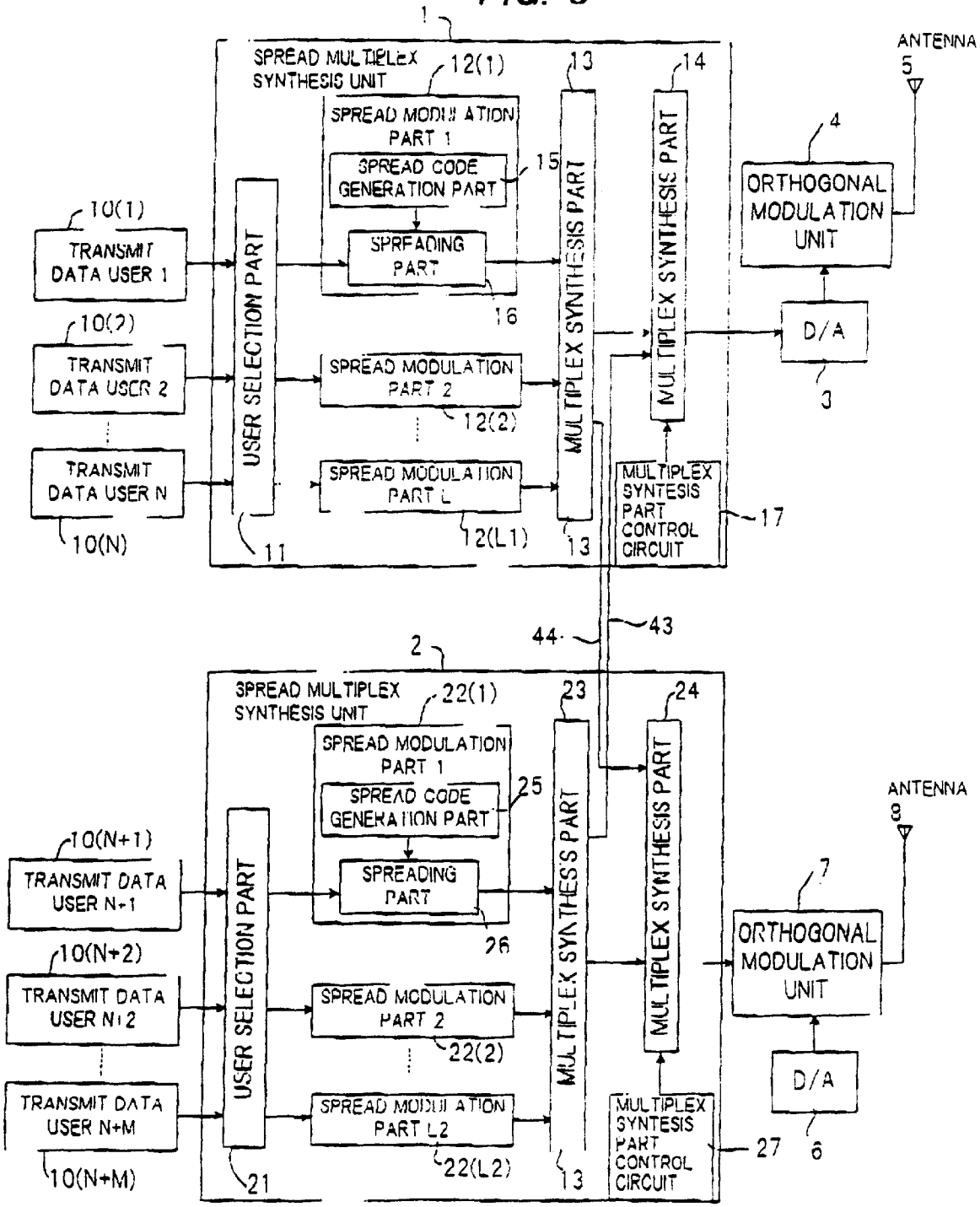
FIG. 5 is a block diagram showing the composition of a CDMA base station transmission device in a second preferred embodiment according to the invention.

FIG. 5 is a block diagram showing a CDMA base station transmission device in the second preferred embodiment according to the invention. The different point from the first embodiment is that the output of the multiplex synthesis part 24 in the spread multiplex synthesis unit 2 is connected to a D/A converter 6 that is connected through an orthogonal modulation unit 7 to an additional transmission antenna 8, thereby data can be transmitted through the two transmission antennas. The other different point is that the output of spread-multiplexed data from the multiplex synthesis part 13 in the spread multiplex synthesis unit 1 is also input through a route 44 to the multiplex synthesis part 24 in the spread multiplex synthesis unit 2.

By the composition in FIG. 5, even when the number of antennas becomes two, user data can be multiplexed toward designated one of the transmission antennas, like the first embodiment.

Also, even when the number of users to be sent to one of the transmission antenna increases, multiplexed data from the other spread multiplex synthesis unit can be synthesized using the routes 43 and 44.

Also, in the composition in FIG. 5, by controlling the operation of the multiplex synthesis part control circuit in each spread multiplex synthesis unit not to conduct the multiplexing and to output data, the spread multiplex synthesis units can operate using either of the antennas.

In the above embodiments, means for synthesizing also multiplexed data from the other spread multiplex synthesis unit in one spread multiplex synthesis unit is provided. Therefore, an increase in the scale of circuit part dependent on each unit of antenna can be suppressed. Also, even when the number of users to be transmitted increases, the device adaptable can be composed easily by the addition of spread multiplex synthesis unit. Especially as the number of the transmission antenna increases, a reduction in the number of circuit wiring owing to the device composition of the invention becomes significant.

Meanwhile, the multiplex synthesis part 24 and the multiplex synthesis part control circuits 17, 27 in the first embodiment are provided to show that the invention can be made up even by adding the same spread multiplex synthesis unit. In fact, even when they are not employed, the spread multiplex synthesis units can function similarly.

Although the invention has been described with respect to specific embodiment for complete and clear disclosure, the appended claims are not to be thus limited but are to be constructed as embodying all modification and alternative constructions that may be occurred to one skilled in the art which fairly fail within the basic teaching here is set forth.

What is claimed is:

1. A CDMA base station transmission for spreading transmit data by spread code to each user for each symbol as unit data of each user, multiplex-synthesizing the spread data by the number of users, D/A-converting the multiplexed data, modulating the D/A-converted data into radio frequency band, then transmitting the modulated data through an antenna, comprising:

a first spread multiplex synthesis unit that spreads and multiplexes transmit data of a predetermined number of users to be selected from a plurality of users; and a second spread multiplex synthesis unit that is additionally provided when the number of users increase and that spreads and multiplexes transmit data of a predetermined number of users to be selected from a plurality of users;

wherein said first spread multiplex synthesis unit is provided with a first multiplex synthesis part inside the unit, and said first multiplex synthesis part adds the spread-multiplexed data of said first spread multiplex synthesis unit and the spread-multiplexed data of said second spread multiplex synthesis unit, D/A-converts the added spread-multiplexed data, modulates it into radio frequency band, transmits it through the antenna.

2. A CDMA base station transmission device, according to claim 1, wherein:

said first spread multiplex synthesis unit is further provided with a first control means for controlling said first multiplex synthesis part inside the unit, said second spread multiplex synthesis unit is provided with a second multiplex synthesis part and a second control means for controlling said second multiplex synthesis part inside the unit, and said first or second multiplex synthesis part adds the spread-multiplexed data of said first spread multiplex synthesis unit and the spread-multiplexed data of said second spread multiplex synthesis unit, D/A-converts the added spread-multiplexed data, modulates it into radio frequency band, transmits it through the antenna.

3. A CDMA base station transmission device, according to claim 2, wherein:

said first and second control means control either of said first multiplex synthesis part and said second multiplex synthesis part to operate.

4. A CDMA base station transmission device, according to claim 2, wherein:

said first and second control means control said first multiplex synthesis part and said second multiplex synthesis part to stop the multiplexing of the spread-multiplexed data and to output the respective spread-multiplexed data, so that said first and second spread multiplex synthesis units operate using an antenna associated with each unit.

5. A method for conducting the spread multiplex transmission in a CDMA base station transmission device, comprising the steps of:

in a first multiplex synthesis unit for spreading transmit data by spread code to each user for each symbol as unit data of each user, multiplex-synthesizing the spread data by the number of users, adding the spread-multiplexed data of said first spread multiplex synthesis unit and the spread-multiplexed data of a second spread multiplex synthesis unit that is additionally provided;

D/A-converting the added spread-multiplexed data;

modulating the D/A-converted data into radio frequency band; and transmitting the modulated data through an antenna.

6. A method for conducting the spread multiplex transmission in a CDMA base station transmission device, comprising the steps of:

in a first spread multiplex synthesis unit for spreading transmit data by spread code to each user for each symbol as unit data of each user, multiplex-synthesizing the spread data by the number of users, adding the spread-multiplexed data of said first spread multiplex synthesis unit and the spread-multiplexed data of a second spread multiplex synthesis unit that is additionally provided;

in said second spread multiplex synthesis unit, adding the spread-multiplexed data of said first spread multiplex synthesis unit and the spread-multiplexed data of said second spread multiplex synthesis unit;

D/A-converting the added spread-multiplexed data;

modulating the D/A-converted data into radio frequency band; and transmitting the modulated data through an antenna for each unit.

7. A method for conducting the spread multiplex transmission in a CDMA base station transmission device, according to claim 6, wherein:

one of said spread-multiplexed data added in said first spread multiplex synthesis unit and the spread-multiplexed data added in said second spread multiplex synthesis unit is D/A-converted, modulated into radio frequency band, and transmitted through the antenna for the associated unit.

8. A method for conducting the spread multiplex transmission in a CDMA base station transmission device, according to claim 6, wherein:

the adding of the spread-multiplexed data of said first spread multiplex synthesis unit and the spread-multiplexed data of said second spread multiplex synthesis unit is stopped, and the spread-multiplexed is D/A-converted for each antenna, modulated into radio frequency band, transmitted through the antenna for the associated unit.

* * * * *